US011952140B2

(12) United States Patent
Casado-Montero et al.

(10) Patent No.: US 11,952,140 B2
(45) Date of Patent: Apr. 9, 2024

(54) COOLING SYSTEM (71) Applicant: Airbus Operations S.L.U., Getafe (ES)

(72) Inventors: Carlos Casado-Montero, Getafe (ES); Alberto Molina Parga, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 373 days.

(21) Appl. No.: 17/073,675

(22) Filed: Oct. 19, 2020

(65) Prior Publication Data

US 2021/0114742 A1 Apr. 22, 2021

(30) Foreign Application Priority Data

Oct. 21, 2019 (EP) .................................... 19382916

(51) Int. Cl.
*F01N 5/02* (2006.01)
*B64D 33/10* (2006.01)
*F15D 1/00* (2006.01)
*F28F 13/02* (2006.01)

(52) U.S. Cl.
CPC ........... *B64D 33/10* (2013.01); *F15D 1/0025* (2013.01); *F28F 13/02* (2013.01)

(58) Field of Classification Search
CPC ......... B64D 33/10; F25D 1/0025; F28F 13/02
USPC .................................................. 165/51, 140
See application file for complete search history.

(56) References Cited

U.S. PATENT DOCUMENTS

| 4,202,296 | A | 5/1980 | Nonnenmann et al. |
| 6,568,203 | B1 | 5/2003 | Leathers |
| 7,434,765 | B2 * | 10/2008 | Zielinski ............... F28D 1/0435 244/57 |
| 11,419,241 | B2 * | 8/2022 | Laneryd ............. H05K 7/20263 |
| 2014/0367476 | A1 | 12/2014 | Pomme |
| 2017/0038149 | A1 * | 2/2017 | Spreeman ............... F28F 1/006 |
| 2017/0190428 | A1 | 7/2017 | Casado Montero |
| 2018/0051716 | A1 * | 2/2018 | Cheung ................... F04D 25/02 |
| 2018/0124950 | A1 * | 5/2018 | Holahan ............. H05K 7/20272 |
| 2019/0137185 | A1 * | 5/2019 | Stein ........................ F28D 7/024 |
| 2019/0390925 | A1 * | 12/2019 | Sangli ............... B01F 25/31243 |

FOREIGN PATENT DOCUMENTS

GB 2563056 A 12/2018

OTHER PUBLICATIONS

European Search Report; priority document.

* cited by examiner

*Primary Examiner* — Claire E Rojohn, III (74) *Attorney, Agent, or Firm* — Greer, Burns & Crain, Ltd.

(57) ABSTRACT

A cooling system for an aircraft, including a heat exchanger for cooling a hot fluid with cooling air, an air intake for the supply of cooling air and a Coandă-effect air amplifier for the creation of a flow of cooling air.

13 Claims, 6 Drawing Sheets

COOLING SYSTEM

CROSS-REFERENCES TO RELATED APPLICATIONS

This application claims the benefit of the European patent application No. 19382916.5 filed on Oct. 21, 2019, the entire disclosures of which are incorporated herein by way of reference.

FIELD OF THE INVENTION

The present invention belongs to the field of cooling systems for aircraft, and it is directed to a cooling system for an aircraft, comprising a heat exchanger for cooling a hot fluid with cooling air, an air intake for the supply of cooling air and a Coandă-effect air amplifier for creating a flow of cooling air.

BACKGROUND OF THE INVENTION

Most aircraft comprise thermal engines or other elements which generate waste heat, which must be dissipated to ensure the correct operation of the aircraft. Usually, the heat dissipation is achieved by means of cooling systems optimized for aircraft use.

Generally, these cooling systems suitable for aircraft comprise heat exchangers for cooling with air a fluid heated with the waste heat; regardless of their configuration, the heat exchangers normally consist of metal parts and tend to be heavy. This results in the increase of dead weight to the aircraft, which is an undesired effect. Whereas very few lighter, alternative materials are known, the design and configuration of heat exchangers can be improved in order to reduce its weight.

In this respect, the heat transfer rate of a heat exchanger can be enhanced by increasing the velocity of the flow of coolant, with a forced convection system. A known solution for establishing a forced convection is the use of fans. Fans, in particular blade fans, produce a relatively high flow of air which cools down the hot fluid.

Even though blade fans are simple and cheap, they are bulky and heavy and therefore fail to solve the above mentioned problem. Additionally, they require a dedicated engine and a power source. This requirement further increases the weight of the cooling system and can produce problems with the integration of the heat exchangers in the airframe of an aircraft, where the available room is scarce.

Furthermore, fans are known to generate a high amount of vibration and noise, which might be detrimental for the operation of the aircraft and disturbing for the passengers.

SUMMARY OF THE INVENTION

The present invention provides a solution for the aforementioned problems.

In a first inventive aspect, the invention provides a cooling system for an aircraft, comprising a heat exchanger for cooling a hot fluid with cooling air, comprising a cooling air inlet in fluid communication with a cooling air outlet and a hot fluid inlet in fluid communication with a hot fluid outlet by means of one or more hot fluid conduits, wherein the one or more hot fluid conduits are configured to transfer heat between a flow of hot fluid flowing between the hot fluid inlet and the hot fluid outlet, and a flow of cooling air flowing between the cooling air inlet and the cooling air outlet;

an air intake for the supply of cooling air from outside of the cooling system to the heat exchanger, wherein the air intake is in fluid communication with the cooling air inlet of the heat exchanger; and a Coandă-effect air amplifier comprising an air amplifier inlet, an air amplifier outlet, a pressurized air inlet and a pressurized air outlet configured as a nozzle, the Coandă-effect air amplifier being configured to create a flow of cooling air between the air amplifier inlet and the air amplifier outlet induced by a stream of pressurized air injected through the nozzle, wherein the air amplifier inlet is in fluid communication with the cooling air outlet of the heat exchanger.

Throughout this document, Coandă-effect air amplifier should be understood as a device capable of creating an inducted flow of air by accelerating a low energy air flow by means of the difference of pressures generated by the injection of a high energy stream of air over a profiled surface, termed Coandă-effect profile, which exploits the advantages of the Coandă-effect. The Coandă-effect profile should be understood as a closed profile according to the span direction, and slightly curved according to the chord direction. The specific shape of the profile according to the chord direction is dependent on the design parameters and the desired effects of the air amplifier, such as the pressure of the air stream of the target velocity of the cooling air flow.

In an embodiment, the Coandă-effect air amplifier comprises a Coandă-effect profile positioned between the air amplifier inlet and the air amplifier outlet and the nozzle is configured for the injection of a stream of air over the Coandă-effect profile at a higher pressure than the cooling air, wherein the nozzle has a closed configuration and is positioned between the air amplifier inlet and the Coandă-effect profile. The Coandă-effect air amplifier further comprises a chamber in fluid communication with the nozzle for the supply of high pressure air to the nozzle, such that the stream of high pressure air over the Coandă-effect profile creates a low pressure region on a portion of the Coandă-effect profile, accelerating the flow of cooling air.

The term cooling air should be understood as the mass of air surrounding the aircraft during operation, at substantially the same thermodynamic conditions, which is used as coolant air for the heat exchanger.

Advantageously, the cooling system with a Coandă-effect air amplifier comprises fewer elements and moving parts while providing a higher mass flow of air than the known solutions. Also, the cooling system does not require a dedicated driving engine and an associated power source, therefore being lighter and simpler than the prior art.

In a particular embodiment, the cooling system comprises a plurality of hot fluid conduits. Preferably, the hot fluid conduits are arranged spaced from each other. More preferably, the hot fluid conduits are arranged substantially parallel and spaced from each other.

In a particular embodiment, the cooling system comprises a plurality of hot fluid conduits, wherein the plurality of hot fluid conduits are arranged in a tubular configuration defining a hollow interior volume, and wherein the cooling air flows between the hot fluid conduits and through the hollow interior volume of the tubular configuration of the hot fluid conduits.

Advantageously, the hot fluid conduits are arranged spaced from each other, thus allowing the cooling air to flow between the hot fluid conduits. Additionally, the tubular configuration of the plurality of hot fluid conduits defines a hollow interior volume for the passage of cooling air which allows the unhindered flow of heated cooling air from the hot fluid conduits.

In a particular embodiment, one or more hot fluid conduits, the hot fluid inlet and the hot fluid outlet define at least part of a hot fluid circuit.

Advantageously, the hot fluid conduits establish a fluid communication between the hot fluid inlet and the hot fluid outlet, and their walls provide for a wide thermal contact surface with the cooling air, thus increasing the heat transfer.

In an embodiment, the heat exchanger further comprises a plurality of hot fluid circuits with corresponding hot fluid inlets and hot fluid outlets.

Advantageously, a plurality of hot fluid circuits, and their corresponding inlets and outlets, provide for the simultaneous cooling of several hot fluids with a single cooling system.

In a particular embodiment, the hot fluid circuits are arranged in different sectors of the tubular configuration.

According to this embodiment, the hot fluid circuits are arranged in different sectors around the tubular configuration, i.e., as sectors of a hollow cylinder defined by planes containing the axis of the cylinder.

In an embodiment, each hot fluid circuit is in a specific sector, different from the sector occupied by another hot fluid circuit.

Advantageously, this configuration allows for a compact and simple, yet effective heat exchanger for cooling a single or multiple hot fluids.

In an embodiment, each hot fluid circuit is configured to transport a different hot fluid.

Advantageously, each hot fluid circuit is dedicated to a different fluid, thus allowing for the simultaneous cooling of hot fluids used in different subsystems of the aircraft.

The hot fluid may be selected from the list consisting of: water, air, lubrication oil, coolant fluid. The hot fluid may for example be a lubrication oil from a generator, an engine coolant fluid or a high pressure air from a compressor.

In a particular embodiment, the value of at least one dimension of a hot fluid conduit of a first hot fluid circuit is different from the value of the same dimension of a hot fluid conduit of a second hot fluid circuit.

Advantageously, the hot fluid circuits are optimized for the properties of the conveyed fluid, such as density, viscosity and heat capacity; thus, for a given target value of transferred heat, circuits conveying high heat capacity fluids (such as oil or water) can be downsized in respect of circuits configured for conveying fluids with lower heat capacity, such as gases.

In a second inventive aspect, the invention provides a power unit for an aircraft, comprising an engine and a cooling system according to the first inventive aspect.

Advantageously, the above described cooling system may be combined with an engine, for example with an auxiliary power unit (APU) gas turbine, forming an assembly or unit.

In a particular embodiment, the engine comprises a source of high pressure air configured to feed the pressurized air inlet of the Coandă-effect air amplifier.

Advantageously, the source of high pressure air is comprised in the same engine of the power unit, thus eliminating the need for a dedicated air compressor. In the case of a gas turbine engine, the source of pressurized air is preferably fed by a bleed from the compressor stage of the engine.

In an embodiment, one or more of the hot fluid inlets are in fluid communication with a hot fluid source of the engine.

Advantageously, hot fluids of the engine, such as lubricating oil or cooling water are cooled down in the cooling system.

In a particular embodiment, the cooling system is housed in a compartment, and the engine is housed in a compartment separated from the compartment housing the cooling system.

Advantageously, in this embodiment the engine is housed in a different, separated compartment such that the heat generated by the engine is not transferred to the cooling system or the cooling air, thus increasing the efficiency of the cooling system.

In a third inventive aspect, the invention provides an aircraft comprising a power unit according to the second inventive aspect.

In a particular embodiment, the power unit is positioned in an aft section of the aircraft.

Advantageously, the location of the power unit, in particular of the cooling system, in an aft section of the aircraft, prevents undesired disturbance of the external air flow around the aircraft.

In an embodiment, the cooling system is positioned near the engine, but in a separate compartment.

Advantageously, the cooling system can be positioned near the engine, thus saving space and reducing the conveying distance of the hot fluids. Also advantageously, positioning the cooling system outside of the engine compartment saves space inside the engine compartment.

In an embodiment, the cooling system is located in a section of the aircraft aft of the section of the aircraft housing the engine.

In an embodiment, the air intake for the supply of cooling air to the cooling system is mounted in a section of the aircraft aft of the section of the aircraft housing the engine, wherein the air intake is configured as an opening in the skin of the aircraft.

In an embodiment, an air outlet of the cooling system is positioned aft of the rest of the elements of the cooling system.

In a particular embodiment, the cooling system is positioned in a housing with rails.

Advantageously, in this embodiment a set of rails attached to the structure of the aircraft, such as the ones used for the introduction and extraction of an APU in the housing of the tail section of an aircraft, are used to fasten the cooling system, so that the cooling system can be introduced and extracted easily, therefore simplifying the maintenance of the cooling system.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

Due to the present invention, it is possible to increase the efficiency of a cooling system (14) of an aircraft (16) and at the same time reduce the dead weight of the aircraft (16). As an additional effect, the cooling system (14) comprises fewer moving parts, which simplifies the maintenance operations, reduces the production costs and increases the overall reliability of the cooling system (14).

Figure 1:
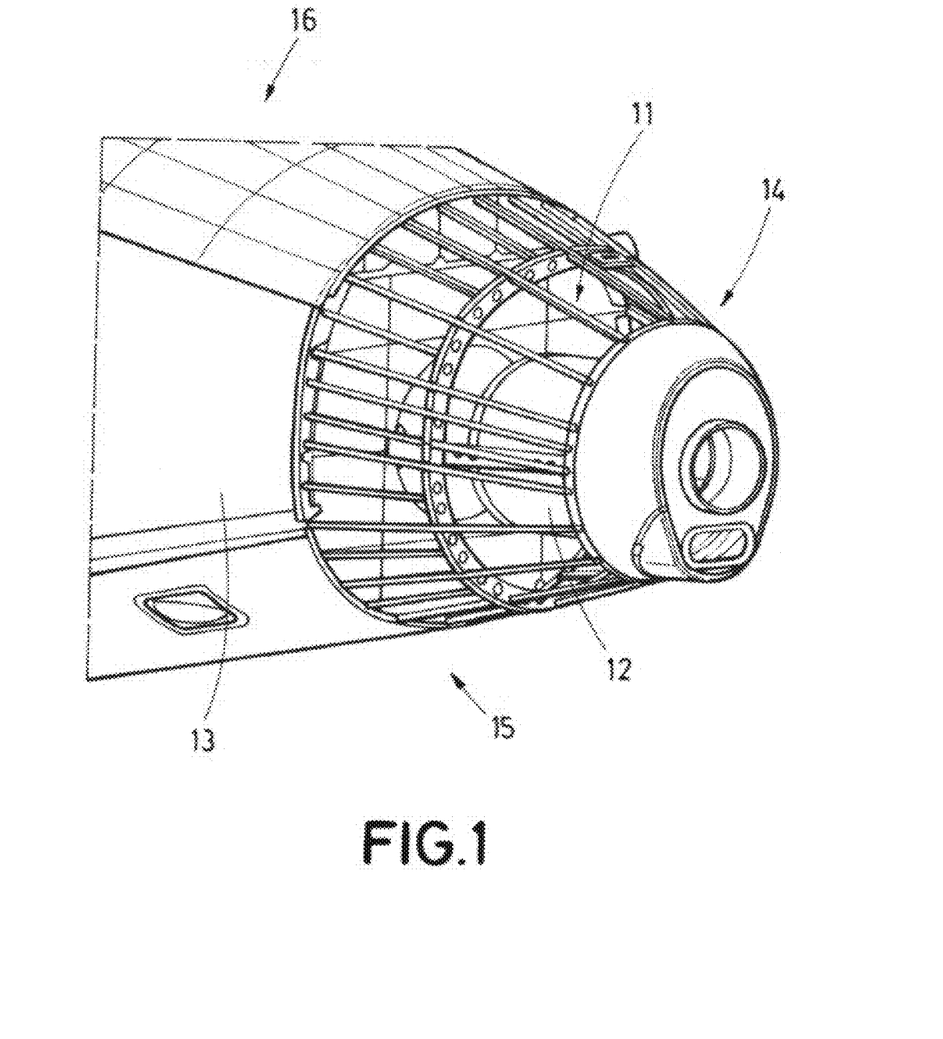
FIG. 1 shows an embodiment of the cooling system attached to the tail section of an aircraft.

FIG. 1 shows a preferred embodiment of the invention, wherein the cooling system (14) is used in combination with an engine (13), forming a power unit (15) assembly installed in an aircraft (16), preferably in its aft section, in or near the tail cone. The engine (13) of the power unit (15) can be an auxiliary power unit (APU) or any other type of engine. Also the engine (13) needs not be a thermal engine, and can be an electric motor as well.

Figure 4A:
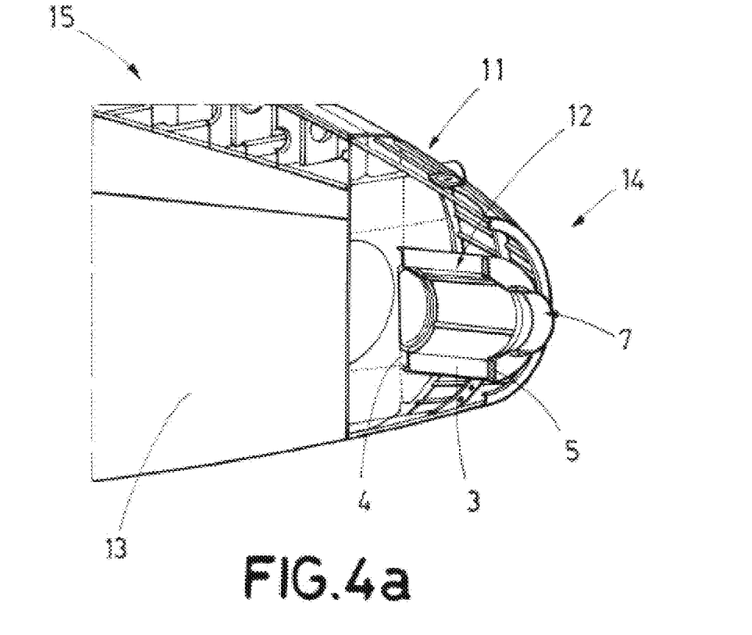
FIGS. 4a-4b show a section view of an embodiment of the power unit and of the cooling system.
Figure 4B:
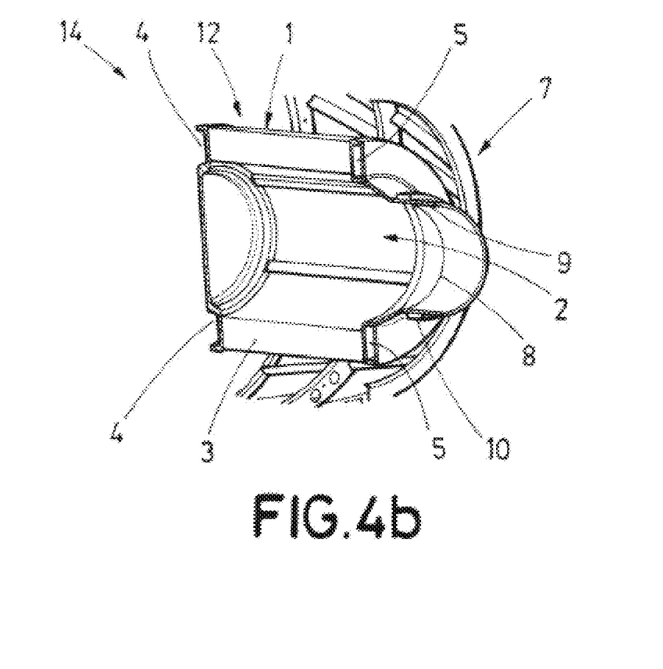

FIGS. 4a and 4b show a section view of an embodiment of the cooling system (14), which is the element responsible for the cooling of the flow of hot fluid with the flow of cooling air.

The cooling system (14) comprises a heat exchanger (12), an external air intake (11) for the supply of cooling air from outside of the cooling system (14) to the heat exchanger (12), and a Coandă-effect air amplifier (7).

The heat exchanger (12), depicted in detail on FIG. 4b, accomplishes the transference of heat. It comprises a plurality of hot fluid conduits (3) arranged according to a tubular configuration and extending from a first end of the heat exchanger (12) to a second end of the heat exchanger (12), a cooling air inlet (1) which in the shown embodiment corresponds with the openings left between the hot fluid conduits (3), and the cooling air outlet (2) at the second end of the heat exchanger (12); additionally the heat exchanger (12) comprises a hot fluid inlet (4) and a hot fluid outlet (5) in fluid communication with the hot fluid conduits (3).

Like other conventional heat exchangers, the depicted heat exchanger (12) transfers heat between a hot fluid (either a gas or a liquid), flowing from hot fluid inlet (4) to the hot fluid outlet (5) through the hot fluid conduits (3), and a flow of cooling air, flowing from the cooling air inlet (1) to the cooling air outlet (2). The cooling air flows first between the hot fluid conduits (3), and then through the hollow interior volume created by the tubular configuration of the bundle or bundles of hot fluid conduits (3).

In this embodiment, the configuration is optimized for a higher mass flow rate of coolant (the cooling air) by means of a tubular configuration.

Figure 6:
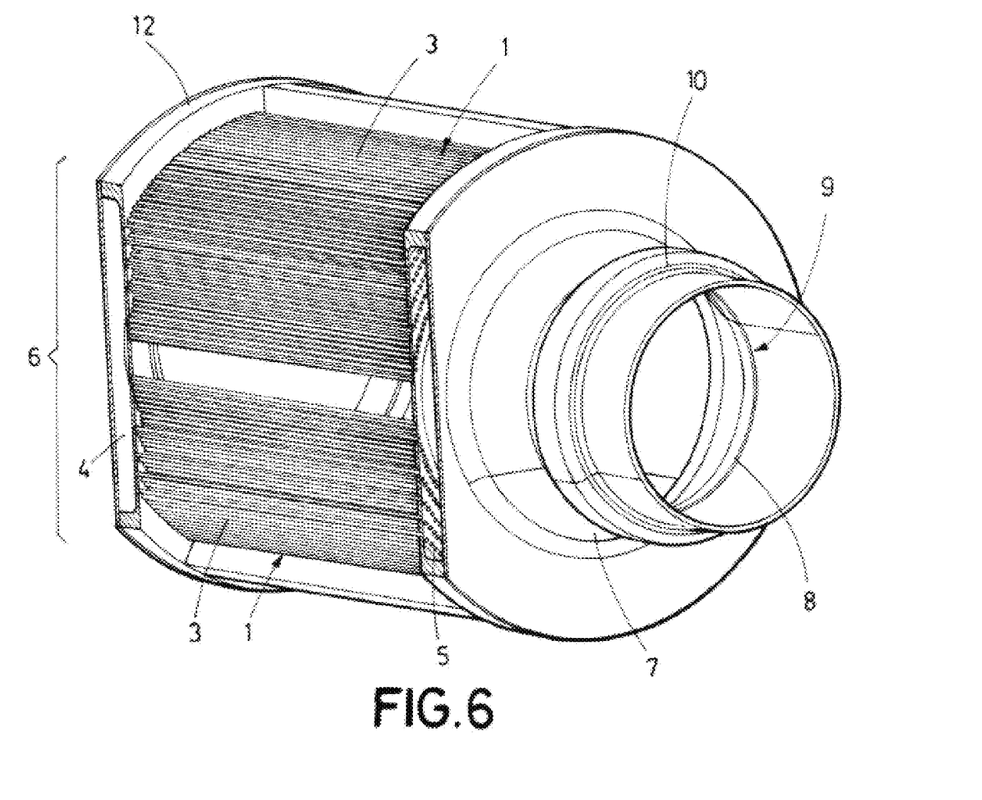
FIG. 6 shows a partial section view of an embodiment of the cooling system.

FIG. 6 shows the air amplifier (7) and the heat exchanger (12) with a partial section, showing the hot fluid inlet (4) at a first end of the heat exchanger (12), and the hot fluid outlet (5) at a second end of the heat exchanger (12), opposite to the first end. In this embodiment, both the hot fluid inlet (4) and the hot fluid outlet (5) have a chamber configuration, and are in fluid communication with the hot fluid conduits (3). As it is apparent from FIG. 6, in this embodiment, there is a large number of hot fluid conduits (3) and they have a small diameter in relation with the length of the hot fluid conduits (3). Also, each hot fluid conduit (3) is spaced from the neighboring hot fluid conduit (3) by a distance which is dependent on the intended performance of the heat exchanger (12), but must allow the passage of the cooling air between the hot fluid conduits (3); therefore, the plurality of these spacings form the cooling air inlet (1).

The tubular configuration of the hot fluid conduits (3) can also be observed, with rows of conduits (3) forming several circumferences positioned concentrically. This tubular configuration creates a hollow interior volume in the core of the heat exchanger (12), which is in communication with the air amplifier (7) by means of the cooling air outlet (2), at the second end of the heat exchanger (12). In a simple embodiment, all the hot fluid conduits (3) are part of a single hot fluid circuit (6); however, the embodiment of FIG. 6 comprises three hot fluid circuits (6) (not shown in this view), each of them with respective hot fluid inlets (4) and outlets (5), positioned on a sector of the tubular configuration; in this view, the depicted hot fluid circuit (6) takes a sector of roughly 120°.

One of the advantages of the embodiment with several hot fluid circuits (6) is the capability to cool down several hot fluids at the same time, for instance compressed air and lubricating oil. Since these two fluids have different physical properties, the heat transfer ratio is different for each fluid. Accordingly, the dimensions of the elements of the hot fluid circuits (6), comprising the hot fluid inlet (4), hot fluid outlet (5) and hot fluid conduits (3), are preferably designed depending on the specific physical properties of the fluid, such as density, heat capacity, viscosity, etc.

In a preferred embodiment, the heat exchanger (12) comprises three hot fluid circuits (6) for engine coolant liquid, generator oil and compressed air, with their corresponding inlets (4), outlets (5) and conduits (3).

Figure 2:
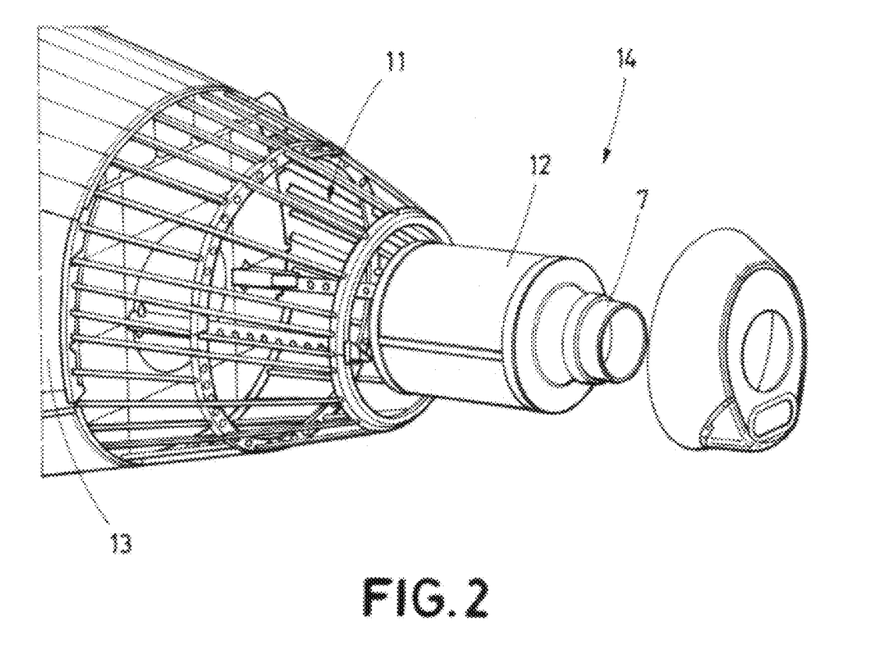
FIG. 2 shows the cooling system partially extracted from its housing in the tail section of an aircraft.
Figure 3:
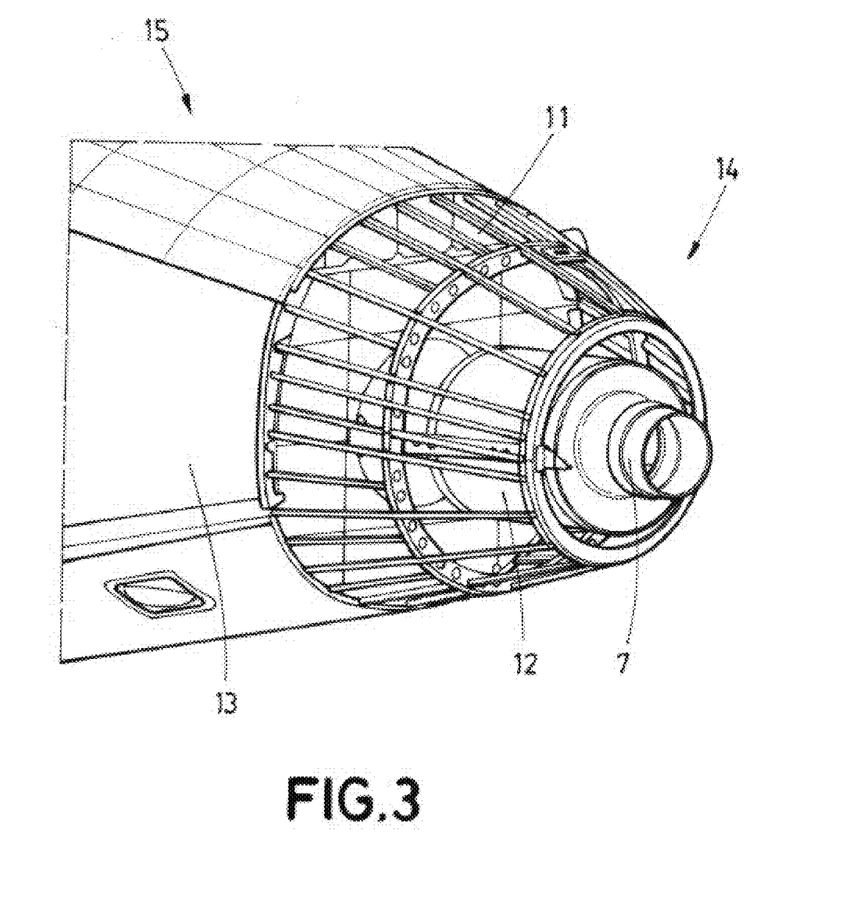
FIG. 3 shows the cooling system attached to the tail section of an aircraft, with the fairing removed.

Now turning to FIGS. 2 and 3, a specific embodiment of the external air intake (11) can be observed in the form of openings between stringers of a tail cone section in the portion immediately upstream of the cooling system (14) housing. The purpose of the external air intake (11) is establishing a fluid communication between the mass of air surrounding the aircraft (16), i.e., the external air, with the cooling air inlet (1). The external air intake (11) provides the majority of the cooling air, and it is advantageously open to the exterior of the aircraft (16) during the operation of the cooling system (14). An alternative embodiment (not shown in the figures) comprises a powered hatch or door closing an opening in the skin of the aircraft (16); the effective opening cross section of the external air intake (11) can thus be regulated like a valve, thereby controlling the amount of cooling air fed to the heat exchanger (12).

The Coandă-effect air amplifier (7), or simply air amplifier (7), is a device which exploits the benefits of the Coandă-effect for creating a greater mass flow, or inducted fluid flow, with a smaller, high velocity stream of fluid, in this case air; FIG. 4b shows an embodiment of the air amplifier (7), comprising a nozzle (8) for injecting a high pressure (or velocity, depending on the degree of expansion) air stream over a Coandă-effect profile (9). Although the shape of the Coandă-effect profile (9) depends on the design requirements and parameters, in most cases it has a slightly curved, convex profile from the point of view of the stream. The high pressure air stream is projected over the profile (9), roughly in a tangent direction in respect of the surface of the profile (9), such that the stream is deflected towards the surface of the profile (9) following its curvature, generating a region of low pressure on the surface of the profile (9); as a result, the surrounding air is thrusted towards the surface of the profile (9), either creating a flow of air or accelerating an existing flow.

The high pressure stream injected over the Coandă-effect profile (9) is generated by feeding high pressure air in a chamber (10) with a closed configuration, and projecting it over the profile (9) through a nozzle (8) with a closed configuration as well. Again, the specific shape of the nozzle (8) (such as the area and shape of the opening) depends on the particular design requirements and parameters. In any case, the nozzle (8) is favorably positioned upstream of the profile (9), so as to make use of the whole surface of the profile (9).

A preferred configuration of the Coandă-effect profile (9), as happens with the heat exchanger (12), is a tubular configuration, preferably substantially cylindrical. This configuration allows for the creation of a flow within the Coandă-effect air amplifier (7), avoiding external disturbances of the flow. Also the profile (9) is preferably positioned downstream of the nozzle (8); in order to work properly, the profile (9) should be arranged with its curved part extending chord-wise, and the profile extending in the span direction such that it forms a closed surface.

The chamber (10) is roughly configured as a torus, with one or more inlet openings for feeding compressed air, and an outlet opening formed by the nozzle (8). Preferably, the nozzle (8) extends uninterrupted along the whole perimeter of the air amplifier (7), but it can be split for structural or constructional reasons.

Figure 5:
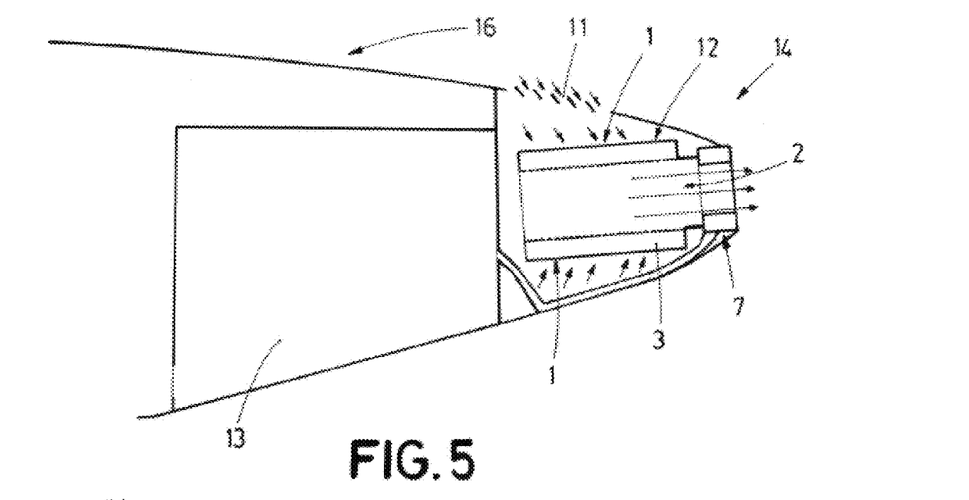
FIG. 5 shows a schematic view of the power unit in the tail section of an aircraft.

FIGS. 1 and 5 show an embodiment of the power unit (15), defined as the assembly of an engine (13) and a cooling system (14) as described above.

In most cases, the cooling system (14) will be dedicated to the cooling of the engine (13), and for convenience, it should be positioned near the engine (13). Thus, if the engine (13) is a gas turbine APU, hot fluids from the engine (13) such as lubricating oil from the generator and water coolant, can be extracted by means of conduits, and fed to corresponding hot fluid circuits (6) of the heat exchanger (12). Additionally, high pressure from the compressor stage of the engine (13) can be cooled down before entering a combustor.

Most engines, even electric motors, produce waste heat; if this waste heat reaches the heat exchanger (12) by heat conduction or increases the temperature of the cooling air, the efficiency of the cooling system (14) may be reduced significantly. Therefore, it is beneficial to have the engine (13) housed in a different space to the cooling system (14), for example as shown in FIGS. 1 and 5, by housing the engine (13) in a separate compartment; or in a simpler configuration, not depicted in the figures, splitting the housing of the power unit (15) with an isolated bulkhead.

The flexibility of the cooling system (14) allows for the installation of the sources of hot fluids at a distant location; for instance, the cooling system (14) can be placed in the aft section of the aircraft (16) while the engine (13) can be positioned in a middle section of the aircraft (16), owing to a better balance of the aircraft (16), room availability, etc.

In a preferred embodiment, as shown in FIGS. 1 and 2, the whole assembly of the power unit (15) is introduced in the aircraft (16); an advantageous position for the cooling system (14) is the tail cone of the aircraft (16), where the exhaust flow of the cooling air (at this stage warm) would be less disturbing for the operation of the aircraft (16). Also, the tail cone is a section of the aircraft (16) which is not well suited for the storage of cargo, and can be better used in this way.

In the same embodiment of FIGS. 1 and 2, the cooling system (14) is configured as a package or cartridge, with standardized dimensions; preferably, the configuration of the cartridge is such that it can be introduced in the APU bay. To that end, the cooling system (14) cartridge may comprise guiding slots matching with existing APU guiding rails.

Figure 7:
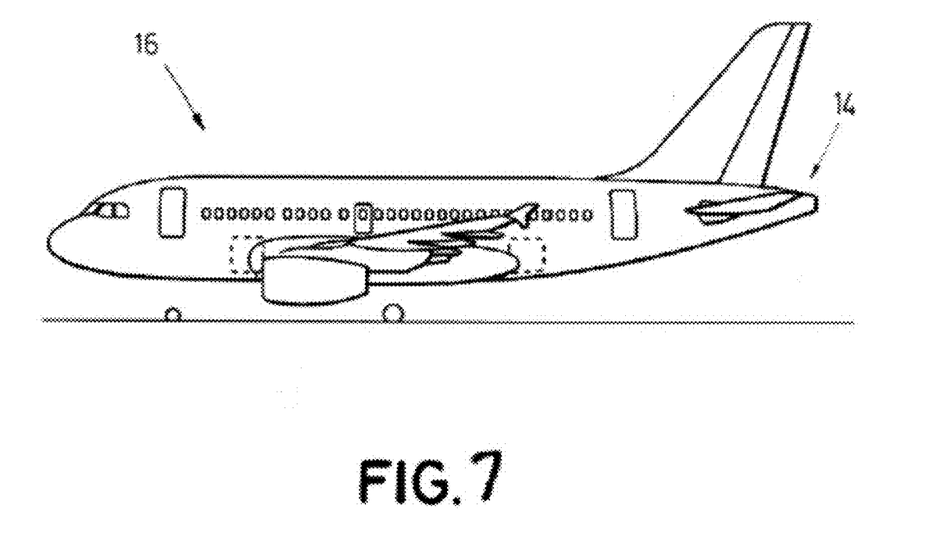
FIG. 7 shows an aircraft with a cooling system according to an embodiment of the invention.

FIG. 7 shows an aircraft (16) with a cooling system (14) as described above, positioned at the aft section of the aircraft (16).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cooling system for an aircraft, comprising:
    a heat exchanger for cooling a hot fluid with cooling air, comprising:
        a cooling air inlet in fluid communication with a cooling air outlet and
        a hot fluid inlet in fluid communication with a hot fluid outlet by means of one or more hot fluid conduits,
    wherein the one or more hot fluid conduits are configured to transfer heat between a flow of hot fluid flowing between the hot fluid inlet and the hot fluid outlet, and a flow of cooling air flowing between the cooling air inlet and the cooling air outlet;
    an air intake configured to supply cooling air from outside of the cooling system to the heat exchanger, wherein the air intake is in fluid communication with the cooling air inlet of the heat exchanger; and
    a Coandă-effect air amplifier comprising an air amplifier inlet, an air amplifier outlet, a pressurized air inlet and a pressurized air outlet configured as a nozzle, the Coandă-effect air amplifier being configured to create a flow of cooling air between the air amplifier inlet and the air amplifier outlet induced by a stream of pressurized air injected through the nozzle, wherein the air amplifier inlet is in fluid communication with the cooling air outlet of the heat exchanger,
    wherein the one or more hot fluid conduits comprise a plurality of hot fluid conduits,
    wherein the plurality of hot fluid conduits are arranged in a tubular configuration defining a hollow interior volume, and
    wherein the cooling air flows between the hot fluid conduits from the plurality of hot fluid conduits and through the hollow interior volume of the tubular configuration of the hot fluid conduits such that spacings between adjacent hot fluid conduits of the plurality of hot fluid conduits form the cooling air inlet, and wherein the cooling air flows from the hollow interior volume to the cooling air outlet without passing through the spacings between adjacent hot fluid conduits.

2. The cooling system according to claim 1, wherein the one or more hot fluid conduits, the hot fluid inlet and the hot fluid outlet define at least part of a hot fluid circuit.

3. The cooling system according to claim 1 wherein the heat exchanger comprises a plurality of hot fluid circuits with corresponding hot fluid inlets and hot fluid outlets.

4. The cooling system according to claim 3, wherein the hot fluid circuits are arranged in different sectors of the tubular configuration.

5. The cooling system according to claim 3, wherein each hot fluid circuit is configured to transport a different hot fluid.

6. The cooling system according to claim 3, wherein a value of at least one dimension of a hot fluid conduit of a first hot fluid circuit is different from a value of a at least one dimension of a hot fluid conduit of a second hot fluid circuit, wherein the at least one dimension of the hot fluid conduit of the first hot fluid circuit is the same as the at least one dimension of the hot fluid conduit of the second hot fluid circuit.

7. A power unit for an aircraft, comprising an engine and a cooling system according to claim 1.

8. The power unit according to claim 7, further comprising a source of high pressure air configured to feed the pressurized air inlet of the Coandă-effect air amplifier.

9. The power unit according to claim 7, wherein one or more of the hot fluid inlets are in fluid communication with a hot fluid source of the engine.

10. The power unit according to claim 7, wherein the cooling system is housed in a compartment, and the engine is housed in a compartment separated from the compartment housing the cooling system.

11. An aircraft comprising a power unit according to claim 7.

12. The aircraft according to claim 11, wherein the power unit is positioned in an aft section of the aircraft.

13. The aircraft according to claim 12, wherein the cooling system is positioned in a housing with rails.

\* \* \* \* \*